May 18, 1926.
C. P. ASTROM
1,584,711
METAL STRUCTURE
Filed Dec. 23, 1922
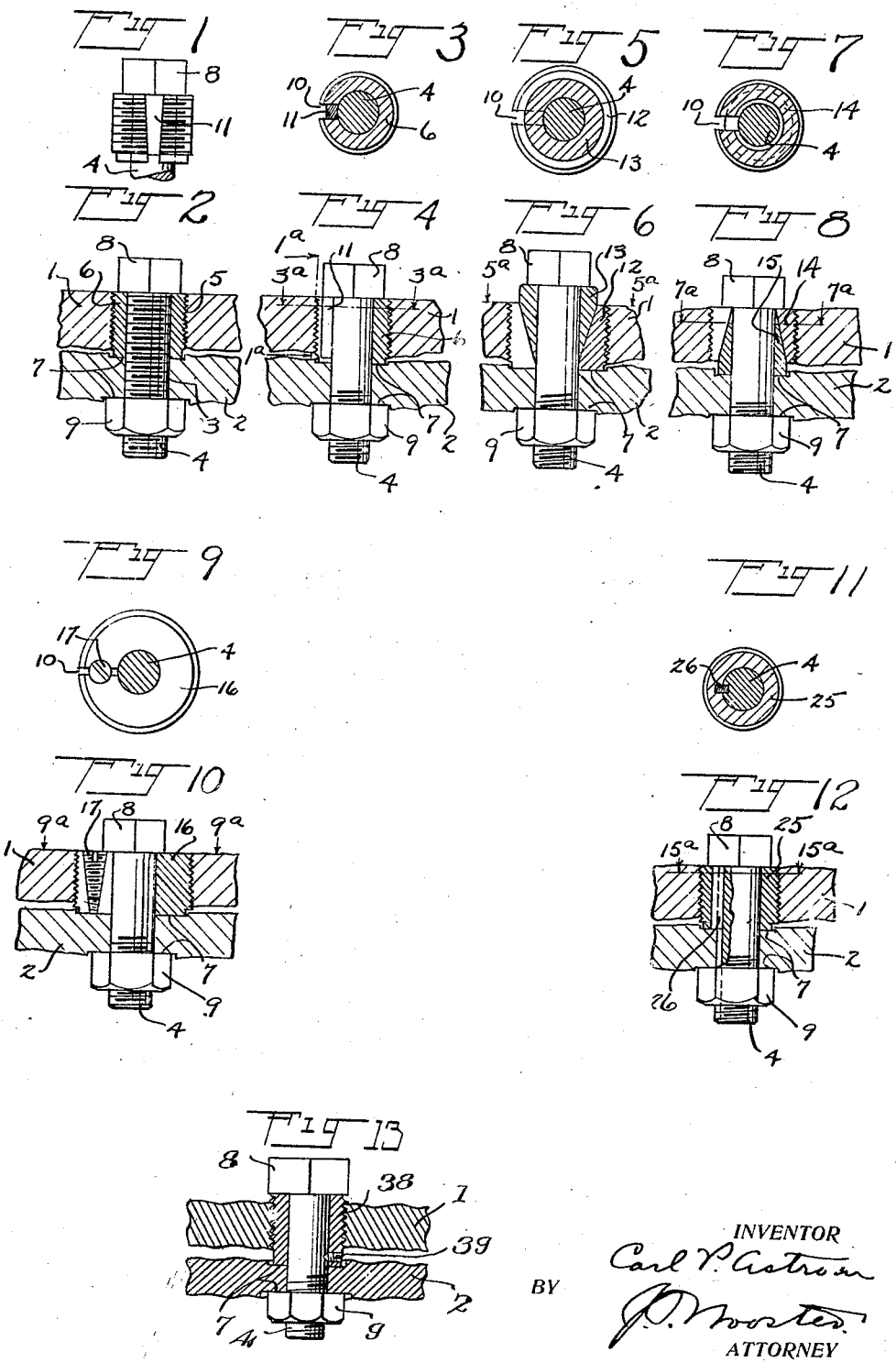
INVENTOR
Carl P. Astrom
BY
J. P. Wooster
ATTORNEY Patented May 18, 1926.

1,584,711

UNITED STATES PATENT OFFICE.

CARL P. ASTROM, OF EAST ORANGE, NEW JERSEY, ASSIGNOR TO M. H. TREADWELL COMPANY, OF NEW YORK, N. Y., A CORPORATION OF NEW YORK.

METAL STRUCTURE.

Application filed December 23, 1922. Serial No. 608,653.

This invention relates to improvements in means for clamping metal parts together without the use of planed surfaces, shims, or wedges, described in my Patent No. 1,440,576, dated Jan. 2, 1923, for metal structure and method of securing parts, and has for its object to retain such clamping means in position and prevent its coming out of adjustment by knocks or jolts of the kind which frequently cause threaded parts to come loose.

According to this invention, means are provided for preventing the bushing and bolt of my above mentioned patent from coming out of adjustment or turning after being tightened in adjusted position. The locking is accomplished by the use of a pin through the bushing engaging the bolt, by the expansion of the bushing or by other means.

In the accompanying drawings,

Figure 1 is a section on the line 1ª—1ª of Fig 4,

Fig. 2 shows a modification in which the bolt is threaded within the bushing.

Fig. 3 is a section on the line 3ª—3ª of Fig. 4,

Fig. 4 illustrates the invention comprising an expansion bushing.

Fig. 5 is a section on the line 5ª—5ª of Fig. 6,

Fig. 6 illustrates another arrangement of split bushing,

Fig. 7 is a line on the section 7ª—7ª of Fig. 8,

Fig. 8 shows another form of split bushing with the wedge on the inner side,

Fig. 9 is a section on the line 9ª—9ª of Fig. 10,

Fig. 10 illustrates still another form of expansion bushing,

Fig. 11 a section on the line 15ª—15ª of Fig. 12,

Fig. 12 shows a bushing and fastening interlocked by means of a removable key, and Fig. 13 shows a set-screw between the bushing and fastening.

This invention is adapted for securing metal parts together in the desired relation as to height and level without the necessity and expense of planing any of their surfaces, and dispenses with the necessity of using shims or wedges between said parts to properly space them the desired amount. As shown in the drawing numerals 1 and 2 indicate the two fixed overlapping members which are to be secured and may be the foundation and base ring of a large machine, which are to be joined in fixed position. One member is provided with a hole 3 extending therethrough to receive a fastening means 4, while the other member is provided with a larger hole 5 aligned with the hole 3 in the first member and tapped to receive a bushing or spacing member 6, interlocked by threading into the hole 5, so as to form a part of the member 1. Because the bushing is of larger diameter than the fastening means its external threads will be stronger than the threads of the fastening means. To do away with the necessity of planing, the opposite surfaces of member 2 are spot spaced around the hole 3, as at 7, to provide surfaces having a predetermined relation with the axes of the holes 3 and 5. This spot facing operation may be performed in a drill press at less expense than the more difficult operation of planing. The bushing 6 bears on the inner spot faced portion 7, while the nut 9 of the fastening is properly seated on the outer spot faced portion 7 of the member 2. In order to afford a firm seat for the head 8 of the fastening means the bushing 6 is preferably of larger diameter than the bolt head 8.

In Fig. 2 the bolt 4 is shown as being in threaded cooperation with the bushing 6 and the member 2 so that with the nut 9 tightened on the bolt 4, the bolt serves to prevent the bushing from turning. One way in which the bolt may be threaded onto both the bushing and member 2, and yet have the bushing firmly seated on the spot faced portion 7, is to temporarily clamp the bushing 6 in position on the spot faced portion, and then tap both the bushing and hole 3 in one operation.

In Figs. 1, 3 and 4 the bushing 6 is shown as being provided with a slot 10 in which the tapered wedge 11 is adapted to be pressed down by the bolt head 8 and expand the bushing into a tighter cooperation with the member 1 to prevent the bushing becoming accidentally loosened, or out of adjustment.

In Figs. 5 and 6, the bushing 12 is also slotted in the manner of the bushing shown in Figs. 3 and 4, but is provided with a different shaped wedge 13, which in Fig. 6 is shown as being of circular cross section cooperating with the under side of the bolt head and on tightening the bolt, is adapted to slide on the tapered inner surface of the bushing 12 and expand it.

Figs. 7 and 8 show an embodiment similar to Figs. 5 and 6, but in which the wedge 15 is disposed on the inner side of the bushing and is in cooperation with the spot faced portion 7 as a part of the bushing.

The expansible bushing 16 shown in Figs. 9 and 10 is controlled by the wedge 17, which in this instance is located outside the bolt head and is provided with screw threads for holding it in position.

Or again, the longitudinal locking means between the bolt and bushing may comprise a removable key or pin 26 cooperating with slots in both the bushing 25 and bolt 4, as shown in Figs. 11 and 12. The bushing 38 may have the set screw 39 transversely arranged for cooperation with the bolt as shown in Fig. 13.

From the foregoing description it will be seen that this invention not only comprises all the advantages and benefits of simplicity, convenience and reduced cost inherent in the device of my previous Patent No. 1,440,576 for metal structure and method of securing parts, dated Jan. 2, 1923, but this invention also has the added advantage of providing means for locking the parts in adjusted position whereby the metal members after being clamped together in the desired relation will not get out of adjustment through the ordinary knocks or jolts that might cause displacement of threaded parts without the locking means. The nuts 9 for the bolt may, if desired, be some form of lock nut.

What is claimed is:

1. A joined metal structure comprising two overlapping members, one having a hole therethrough and its inner surface spot faced around said hole, the second member being provided with a hole therethrough larger than the hole in the first member and aligned therewith, a split bushing rotatably adjustable in the hole in the second member, a fastening passing through the bushing and hole in the first member to clamp said overlapping members together, and a wedge for expanding said bushing and preventing its rotation relative to the second member.

2. A joined metal structure comprising two overlapping members, one having a hole therethrough and its inner surface spot faced around said hole, the second member being provided with a hole therethrough larger than the hole in the first member and aligned therewith, a split bushing rotatably adjustable in the hole in the second member, a fastening passing through the bushing and hole in the first member to clamp said overlapping members together, and a wedge in cooperation with the fastening and bushing and adapted to expand said bushing and prevent its turning within the second member.

3. A joined metal structure comprising two overlapping members, one having a hole therethrough and its inner surface spot faced around said hole, the second member being provided with a hole therethrough larger than the hole in the first member and aligned therewith, a split bushing rotatably adjustable in the hole in the second member, a headed fastening means passing through the bushing and hole in the first member, a wedge within said bushing beneath the head of said fastening means and adapted, on tightening the fastening means, to expand said bushing and prevent its movement within the second member.

4. In a joined metal structure two fixed overlapping members, one provided with a hole therethrough and the other having a larger hole therethrough aligned with the hole in the first member, a bushing threaded in the hole in the second member and in cooperation with the inner surface of the first member, a fastening passing through said bushing and hole in the first member to clamp said overlapping members together and a locking means adapted to expand and retain said bushing in adjusted position and prevent its rotation within the hole in the second member.

5. A joined metal structure comprising two overlapping parts, one having a hole therethrough and its inner surface around said hole being spot faced, the other part having a hole larger than the first hole and aligned therewith, a spacing member threaded in the hole in the second part and in cooperation with the spot faced portion of the first part, a fastening passing through said spacing member and the hole in the first part to clamp the overlapping parts together, said spacing member being provided with means to lock the same in clamped position and prevent its rotation within said second part, said means comprising a member engaged by the fastening and cooperating with the spacing member.

6. A joined metal structure comprising two fixed overlapping members, one having a hole therethrough with its inner surface spot faced around said hole, the other being provided with a hole therethrough larger than the hole in the first member, a spacing member adjustably secured in the hole in the second member and bearing on the spot faced portion of the first member, a headed fastening passing through the hole in the first member for holding said spacing member on the spot faced portion of the first member, and clamping said overlapping members together, and means held down by the head of said fastening and in co-operation with said spacing member for locking it in clamped position with respect to one of said overlapping members.

Signed at New York city in the county of New York and State of New York this 22d day of December, A. D. 1922.

CARL P. ASTROM.